(12) United States Patent
Lin et al.

(10) Patent No.: US 11,003,211 B2
(45) Date of Patent: May 11, 2021

(54) WRISTBAND MOBILE TERMINAL AND CONTROL METHOD THEREOF

(71) Applicant: GUANGDONG OPPO MOBILE TELECOMMUNICATIONS CORP., LTD., Guangdong (CN)

(72) Inventors: Yugui Lin, Guangdong (CN); Jiao Cheng, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 57 days.

(21) Appl. No.: 16/238,598

(22) Filed: Jan. 3, 2019

(65) Prior Publication Data

US 2019/0138050 A1 May 9, 2019

Related U.S. Application Data

(63) Continuation of application No. PCT/CN2017/091852, filed on Jul. 5, 2017.

(30) Foreign Application Priority Data

Jul. 8, 2016 (CN) .......................... 201610542688.5

(51) Int. Cl.
*G06F 1/16* (2006.01)
*H05K 5/00* (2006.01)
(Continued)

(52) U.S. Cl.
CPC ............ *G06F 1/163* (2013.01); *G06F 1/1643* (2013.01); *G06F 1/1652* (2013.01); *G06F 3/041* (2013.01)

(58) Field of Classification Search
CPC ...... G06F 1/163; G06F 1/1643; G06F 1/1652; G06F 3/041
See application file for complete search history.

(56) References Cited

U.S. PATENT DOCUMENTS 5,305,181 A * 4/1994 Schultz .............. G06K 7/10722
361/679.03
7,558,057 B1 * 7/2009 Naksen ................. G06F 1/1613
361/679.3
(Continued)

FOREIGN PATENT DOCUMENTS

CN 202268918 6/2012
CN 103458083 12/2013
(Continued)

OTHER PUBLICATIONS

SIPO, First Office Action for CN Application No. 201610542688, dated Feb. 5, 2018.
(Continued)

*Primary Examiner* — Anthony M Haughton
(74) *Attorney, Agent, or Firm* — Hodgson Russ LLP (57) ABSTRACT

A wristband mobile terminal and a control method for a wristband mobile terminal are provided. The wristband mobile terminal includes: a terminal body, the terminal body including a first side and a second side opposite to the first side, the second side being provided with an accommodating portion; and a ring band, the ring band being capable of being accommodated in the accommodating portion and being capable of being detachably connected to the terminal bod, in which when the ring band is connected to the terminal body, the wristband mobile terminal forms a closed ring.

18 Claims, 3 Drawing Sheets

(51) Int. Cl.
*H05K 7/00* (2006.01)
*G06F 3/041* (2006.01)

(56) References Cited

U.S. PATENT DOCUMENTS

| | | | |
|---|---|---|---|
| 7,915,554 B2* | 3/2011 | Ueda | B62J 99/00 |
| | | | 200/315 |
| 10,545,536 B2 | 1/2020 | Rider et al. | |
| 2006/0209218 A1* | 9/2006 | Lee | G04G 9/00 |
| | | | 349/1 |
| 2010/0004037 A1* | 1/2010 | Ozawa | G06F 1/1616 |
| | | | 455/575.3 |
| 2010/0182677 A1* | 7/2010 | Wang | G02B 9/64 |
| | | | 359/356 |
| 2012/0182677 A1* | 7/2012 | Seo | H04B 1/385 |
| | | | 361/679.01 |
| 2013/0134274 A1* | 5/2013 | Chen | G06F 1/163 |
| | | | 248/231.51 |
| 2016/0073519 A1 | 3/2016 | Hiroki | |
| 2016/0077548 A1* | 3/2016 | Lim | G06F 1/166 |
| | | | 361/679.26 |
| 2016/0116941 A1* | 4/2016 | Kuwabara | G06F 1/163 |
| | | | 361/679.03 |
| 2016/0239046 A1 | 8/2016 | Park et al. | |
| 2016/0306393 A1 | 10/2016 | Huitema | |
| 2016/0313769 A1* | 10/2016 | Yoshitani | G04G 21/04 |
| 2016/0327987 A1 | 11/2016 | Huitema et al. | |
| 2016/0342176 A1 | 11/2016 | Han et al. | |
| 2016/0357222 A1 | 12/2016 | Seo et al. | |
| 2017/0065872 A1 | 3/2017 | Kelley | |
| 2017/0150616 A1* | 5/2017 | Li | H05K 5/0086 |
| 2018/0137801 A1 | 5/2018 | An | |
| 2018/0275715 A1 | 9/2018 | Park et al. | |

FOREIGN PATENT DOCUMENTS

| | | |
|---|---|---|
| CN | 103581428 | 2/2014 |
| CN | 103631369 | 3/2014 |
| CN | 103984441 | 8/2014 |
| CN | 203786602 | 8/2014 |
| CN | 105242797 | 1/2016 |
| CN | 105549785 | 5/2016 |
| CN | 106200801 | 12/2016 |
| EP | 2899623 | 7/2015 |
| KR | 20150120101 | 10/2015 |

OTHER PUBLICATIONS

SIPO, Second Office Action for CN Application No. 201610542688, dated Mar. 29, 2018.
WIPO, ISR for PCT/CN2017/091852, dated Sep. 29, 2017.
EPO, Office Action for EP Application No. 17823642.8, dated May 31, 2019.
USPTO, Notice of Allowance for U.S. Appl. No. 16/437,706, dated Feb. 26, 2020.
IPI, Office Action for IN Application No. 201917003416, dated Jan. 6, 2021.

* cited by examiner

WRISTBAND MOBILE TERMINAL AND CONTROL METHOD THEREOF

CROSS-REFERENCE TO RELATED APPLICATION

The present application is a continuation of International Application No. PCT/CN2017/091852, filed on Jul. 5, 2017, which claims priority to and benefits of Chinese Patent Application No. 201610542688.5, filed on Jul. 8, 2016. The entire disclosures of the aforementioned applications are incorporated by reference herein.

FIELD

The present disclosure relates to a field of electronic technology, and more particularly, to a wristband mobile terminal and a control method thereof.

BACKGROUND

At present, mobile phones, tablet computers and other mobile terminals tend to have a bigger and bigger display screen in order to meet the user's demand for display effects. As the display screen of the mobile terminal is enlarged, the volume of the mobile terminal is increased, and thus the problem that the mobile terminal is inconvenient to carry becomes more and more prominent. Accordingly, how to effectively balance the increased screen size and portability of mobile terminals has become an urgent problem to be solved.

SUMMARY

Embodiments of the present disclosure provide a wristband mobile terminal. The wristband mobile terminal includes: a terminal body including a first side and a second side opposite to the first side, the second side being provided with an accommodating portion; and a ring band capable of being accommodated in the accommodating portion and capable of being detachably connected to the terminal body, in which when the ring band is connected to the terminal body, the wristband mobile terminal forms a closed ring.

Embodiments of the present disclosure provide another wristband mobile terminal. The wristband mobile terminal includes: a terminal body including a first side and a second side opposite to the first side, the second side being provided with an accommodating portion; and a ring band capable of being accommodated in the accommodating portion and having a first end and a second end, the second end being capable of being drawn out of the accommodating portion and connected to the terminal body; and a connecting member configured to connect the ring band to the terminal body; in which when the ring band is connected to the terminal body, the wristband mobile terminal forms a closed ring.

Embodiments of the present disclosure provide a control method for a wristband mobile terminal. The wristband mobile terminal includes a terminal body, the terminal body can be bent. The method include the following operations:

detecting whether the terminal body is bent;
determining positions of a content display area and a touch operation area of a display screen area of a display screen of the wristband mobile terminal, when the terminal body is bent;
receiving an operation instruction input from the touch operation area or the content display area and determining content to be displayed based on the operation instruction; and
outputting the content to be displayed in the content display area.

BRIEF DESCRIPTION OF THE DRAWINGS

In order to illustrate technical solutions of the present disclosure more clearly, drawings required in embodiments will be briefly described below. Obviously, the drawings described below only show a part of embodiments of the present disclosure, and based on these drawings, other drawings can be obtained by those of ordinary skill in the art without creative efforts.

DETAILED DESCRIPTION

Technical solutions in embodiments of the present disclosure will be described clearly and completely with reference to the drawings. Obviously, the described embodiments are only a part of rather than all of the embodiments of the present disclosure. Based on the embodiments of the present disclosure, all other embodiments obtained by those skilled in the art without creative efforts are in the protection scope of the present disclosure.

Embodiments of the present disclosure provide a wristband mobile terminal and a control method thereof, and portability of the wristband mobile terminal according to embodiments of the present disclosure can be improved. The wristband mobile terminal and the control method thereof will be elaborated below.

Embodiments of the present disclosure provide a wristband mobile terminal. The wristband mobile terminal includes: a terminal body including a first side and a second side opposite to the first side, the second side being provided with an accommodating portion; and a ring band capable of being accommodated in the accommodating portion and capable of being detachably connected to the terminal body, in which when the ring band is connected to the terminal body, the wristband mobile terminal forms a closed ring.

Embodiments of the present disclosure provide another wristband mobile terminal. The wristband mobile terminal includes: a terminal body including a first side and a second side opposite to the first side, the second side being provided with an accommodating portion; and a ring band capable of being accommodated in the accommodating portion and having a first end and a second end, the second end being capable of being drawn out of the accommodating portion and connected to the terminal body; and a connecting member configured to connect the ring band to the terminal body; in which when the ring band is connected to the terminal body, the wristband mobile terminal forms a closed ring.

Embodiments of the present disclosure provide a control method for a wristband mobile terminal. The wristband mobile terminal includes a terminal body, the terminal body can be bent. The method include the following operations:

detecting whether the terminal body is bent;

determining positions of a content display area and a touch operation area of a display screen area of a display screen of the wristband mobile terminal, when the terminal body is bent;

receiving an operation instruction input from the touch operation area or the content display area and determining content to be displayed based on the operation instruction; and outputting the content to be displayed in the content display area.

Figure 1:
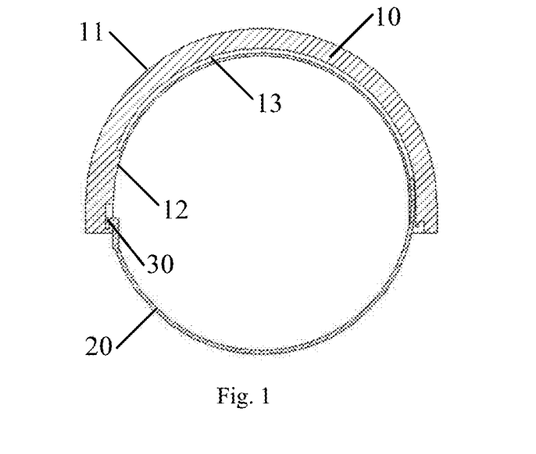
FIG. 1 illustrates a schematic section view of a wristband mobile terminal in a closed state according to an embodiment of the present disclosure.

Referring to FIG. 1 that is a schematic section view of a wristband mobile terminal in a closed state according to an embodiment of the present disclosure, the wristband mobile terminal illustrated in FIG. 1 can be a mobile terminal having a display screen, such as a smart phone (e.g., an Android mobile phone, an iOS mobile phone, etc.), a tablet computer, a palmtop computer, and a personal digital assistant (PDA). As illustrated in FIG. 1, the wristband mobile terminal can include a terminal body 10 and a ring band 20.

The terminal body 10 has a first side 11 and a second side 12 opposite to each other, the first side 11 is provided with a display screen, and the display screen is used for displaying content and performing touch operations, and the second side 12 is provided with an accommodating portion 13. The ring band 20 can be accommodated in the accommodating portion 13.

In the embodiment of the present disclosure, the display screen is generally a touch display screen, and cannot only display a user interface and other content, but also allow a user to perform touch operations on the display screen, which will not be limited in the embodiments of the present disclosure.

In the embodiment of the present disclosure, the second side 12 of the terminal body 10 is a side of the wristband mobile terminal adjacent to the user's skin when the user wears the wristband mobile terminal. When the user does not wear the wristband mobile terminal, the ring band 20 can be accommodated in the accommodating portion 13; and when the user needs to wear the wristband mobile terminal, the user can draw the ring band 20 out of the accommodating portion 13, and connect the ring band 20 to the terminal body 10.

In the embodiment of the present disclosure, when the ring band 20 is connected to the terminal body 10, the wristband mobile terminal can form the closed ring.

In some embodiments of the present disclosure, the terminal body 10 can be flexible, that is, the terminal body 10 can be bent under the action of an external force.

Specifically, the display screen provided to the first side 11 of the terminal body 10 can be a flexible display screen, a housing and internal components of the terminal body 10 can all be flexible, so that the wristband mobile terminal can be normally used when forming the closed ring.

Figure 2:
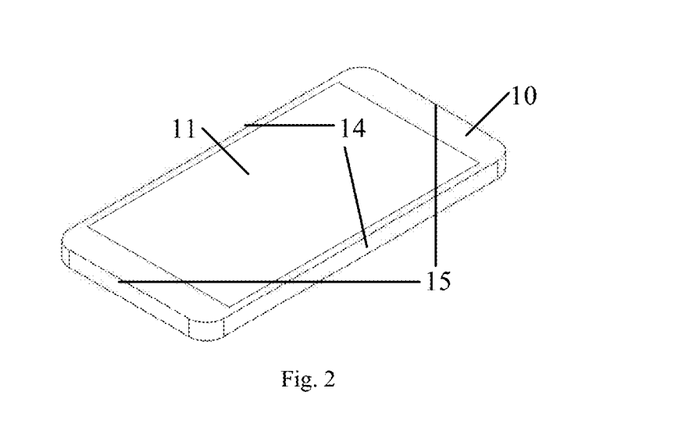
FIG. 2 illustrates a perspective view of a wristband mobile terminal according to an embodiment of the present disclosure.

In some embodiments of the present disclosure, the terminal body has a pair of long edges 14 (as an example of a first edge and a second edge of the terminal body) disposed opposite each other and a pair of short edges 15 (as an example of a third edge and a fourth edge of the terminal body) disposed opposite each other, as illustrated in FIG. 2 that is a perspective view of the wristband mobile terminal according to an embodiment of the present disclosure. The pair of short edges 15 is connected with the pair of long edges 14 in such a way that a frame of the terminal body 10 is formed. The accommodating portion 13 can be an accommodating cavity provided in the second side 12, and the accommodating cavity has a section of a band-like shape and an opening communicated with the accommodating cavity is formed adjacent to one of the short edges 15 of the terminal body 10.

In some embodiments of the present disclosure, the ring band 20 includes a first end and a second end away from each other. The first end is provided in the accommodating cavity, and the ring band 20 can be slidably accommodated in the accommodating cavity. The second end can protrude to the outside of the accommodating cavity through the opening, and be connected to the other short edge 15 of the terminal body 10, so that the wristband mobile terminal can form the closed ring.

In some embodiments of the present disclosure, the accommodating portion 13 can be a reel provided in the second side 12, and the reel is provided in a cavity formed adjacent to one of the short edges 15 of the terminal body 10. The first end of the ring band 20 is normally wound around the reel, and the second end of the ring band 20 can protrude to the outside of the cavity through the opening communicated with the cavity and be connected to the other short edge 15 of the terminal body 10, so that the wristband mobile terminal can form the closed ring.

Figure 3:
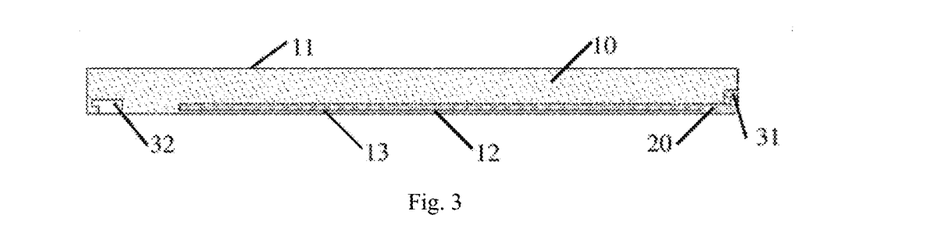
FIG. 3 illustrates a schematic section view of a wristband mobile terminal according to an embodiment of the present disclosure.

In some embodiments of the present disclosure, referring to FIG. 3 which illustrates a schematic section view of a wristband mobile terminal according to an embodiment of the present disclosure. As illustrated in FIG. 3, the ring band 20 includes a connecting element 31 provided at the second end of the ring band 20 and the terminal body 10 includes a connecting cavity 32 provided in the other short edge 15 of the second side of the terminal body 10. The other short edge 15 is a short edge away from the short edge where the opening is positioned. The connecting element 31 can be accommodated in the connecting cavity 32.

In some embodiments of the present disclosure, the connecting element 31 and the ring band 20 are formed integrally.

In some embodiments of the present disclosure, the connecting element 31 and the ring band 20 are formed separately, and the connecting element 31 is connected to the second end of the ring band 20.

In some embodiments of the present disclosure, the connecting element 31 at the second end can be snap-fitted in the connecting cavity 32 provided in the short edge 15, such that the wristband mobile terminal can form the closed ring.

Figure 4:
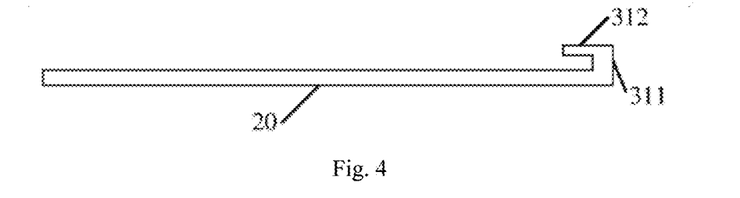
FIG. 4 illustrates a side schematic view of a ring band according to an embodiment of the present disclosure.

Specifically, as illustrated in FIG. 4 which illustrates a side schematic view of a ring band according to an embodiment of the present disclosure, the connecting element 31 at the second end includes a first surface 311 and a second surface 312, in which the first surface 311 is arranged in perpendicular to a plane where the ring band 20 is and a plane where the second surface 312 is, and the second surface 312 is arranged in parallel to the plane where the ring band 20 is.

In some embodiments of the present disclosure, the connecting cavity 32 is L-shaped. Specifically, the connecting cavity 32 includes a first cavity surface and a second cavity surface, the second cavity surface is parallel to the second side of the terminal body 10, and the first cavity surface is perpendicular to the second cavity surface and the second side of the terminal body 10. In some embodiments of the present disclosure, the second cavity surface has a width greater than or equal to a width of the second surface 312 of the connecting element 31, such that the connecting element 31 can be stably snap-fitted in the connecting cavity 32.

In some embodiments of the present disclosure, when the accommodating portion 13 is the accommodating cavity, a section of the accommodating cavity is band-shaped, and a pair of long edges (as an example of a fifth edge and a sixth edge) arranged opposite each other and a pair of short edges (as an example of a seventh edge and an eighth edge) arranged opposite each other surround the accommodating cavity. The pair of short edges surrounding the accommodating cavity is connected with the pair of long edges surrounding the accommodating cavity in such a way that the accommodating cavity is formed.

Specifically, the pair of long edges surrounding the accommodating cavity is parallel to the pair of long edges of the terminal body 10, while the pair of short edges surrounding the accommodating cavity is parallel to the pair of short edges of the terminal body 10. The long edge of the accommodating cavity has a length less than a length of the long edge of the terminal body 10, the short edge of the accommodating cavity has a length less than a length of the short edge of the terminal body 10, that is, the accommodating cavity does not run through the terminal body 10. The opening is formed adjacent to one of the short edges surrounding the accommodating cavity, and has a length less than the length of the short edge of the accommodating cavity.

In some embodiments of the present disclosure, the ring band 20 has a width less than or equal to the length of the opening.

Figure 5:
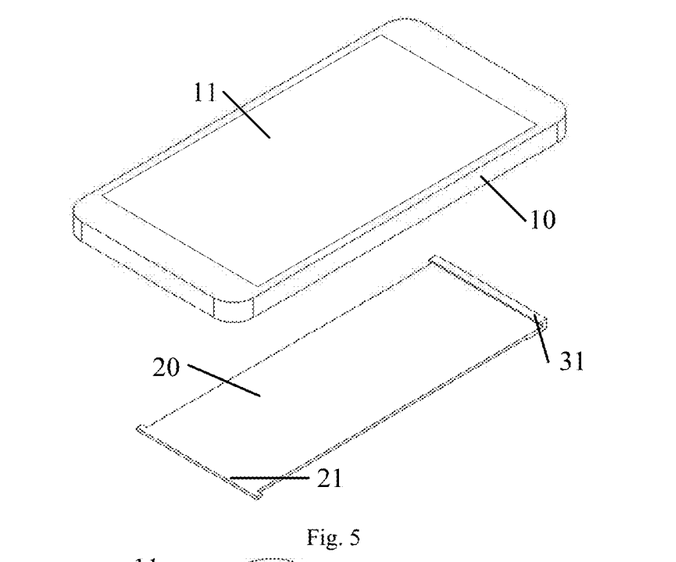
FIG. 5 illustrates an exploded view of a wristband mobile terminal according to an embodiment of the present disclosure.

In some embodiments of the present disclosure, referring to FIG. 5 which illustrates an exploded view of a wristband mobile terminal according to an embodiment of the present disclosure. As illustrated in FIG. 5, when the accommodating portion 13 is configured as the accommodating cavity, the ring band 20 can also be provided with a stop element 21, the stop element 21 has a length greater than the length of the opening and less than the length of the short edge of the accommodating cavity. In other words, the length of the stop element 21 is greater than the width of the ring band.

Since the length of the opening is less than the length of the stop element 21, the stop element 21 cannot protrude outside from the opening, and hence the ring band 20 is not allowed to be completely drawn out of the accommodating cavity.

That is, when the user draws a part of the ring band 20 from the accommodating portion 13 and the ring band 20 is connected to the terminal body, the user's wrist is just attached to the ring band 20 and the second side of the terminal body 10. In such a case, the remaining part of the ring band 20 needs to be stably accommodated in the accommodating portion 13 through the stop element 21, to prevent the wristband mobile terminal from slipping off the user's wrist when the user wears it.

In some embodiments of the present disclosure, one stop element 21 or a plurality of stop elements 21 can be provided, and can be arranged at the first end of the ring band 20 or in a middle position of the ring band 20, which will not be limited in the embodiment of the present disclosure.

In some embodiments of the present disclosure, the ring band 20 can be completely accommodated in the accommodating portion 13, or can be partially accommodated in the accommodating portion 13, which will not be limited in the embodiment of the present disclosure. When the ring band 20 is completely accommodated in the accommodating portion 13, the connecting element 31 at the second end is located at the opening of the accommodating portion 13.

In the embodiment of the present disclosure, when the user does not wear the wristband mobile terminal, the ring band 20 can be completely accommodated in the accommodating portion 13, and in such a case, the connecting element 31 can be disposed at the opening, and the wristband mobile terminal can be used as an ordinary mobile terminal. When the wristband mobile terminal needs to be worn (for example, the wristband mobile terminal is bent), the user can draw the ring band 20 from the opening by applying a force to the connecting member 31, in which case the connecting element 31 can be accommodated in the connecting cavity 32. When the connecting element 31 is accommodated in the connecting cavity 32, the ring band 20 and the terminal body 10 form the closed ring, and the user can wear it on the wrist.

In the embodiment of the present disclosure, the ring band 20 can be drawn out of the accommodating portion 13 when in need, and can be completely accommodated in the accommodating portion when it is not needed, thereby avoiding affecting the aesthetic appearance of the wristband mobile terminal, and improving the portability of the wristband mobile terminal.

Accordingly, according to some embodiments of the present disclosure, the wristband mobile terminal includes the terminal body and the ring band; the terminal body has the first side and the second side arranged opposite each other, the first side is used for displaying content and performing touch operations, and the second side is provided with the accommodating portion; the ring band can be accommodated in the accommodating portion. When the ring band is connected to the terminal body, the wristband mobile terminal forms the closed ring. With the embodiments of the present disclosure, the ring band can be completely accommodated in the accommodating portion when not in need, and hence the wristband mobile terminal can act as an ordinary mobile terminal; when in need, the ring band can be connected to the terminal body, and thus the user can wear it on the wrist. As a result, it is possible to effectively achieve a balance between the increased screen size and the inconvenient-to-carry problem of the mobile terminal, and improve the portability and flexibility of the wristband mobile terminal.

According to some other embodiments of the present disclosure, the wristband mobile terminal includes a terminal body 10, a ring band 20 and a connecting member 30. The terminal body 10 includes a first side 11 and a second side 12 opposite to the first side 11, and the second side 12 is provided with an accommodating portion 13. The ring band is capable of being accommodated in the accommodating portion 13 and has a first end and a second end, and the second end is capable of being drawn out of the accommodating portion 13 and connected to the terminal body 10. The connecting member 30 is configured to connect the ring band 20 to the terminal body 10. When the ring band 20 is connected to the terminal body 10, the wristband mobile terminal forms a closed ring.

According to some embodiments of the present disclosure, the terminal body 10 has a first edge and a second edge opposite to the first edge, the accommodating portion has an opening, the opening is formed adjacent to the first edge, the second end is capable of being drawn out of the accommodating portion 13 through the opening and connected to the terminal body 10 in a position adjacent to the second edge.

According to some embodiments of the present disclosure, a connecting cavity 32 is formed at the second side and adjacent to the second edge, and the second end is capable of being fitted into the connecting cavity 32.

According to some embodiments of the present disclosure, the connecting member 30 and the ring band 20 are formed integrally.

According to some embodiments of the present disclosure, the connecting member 30 and the ring band 20 are formed separately.

Figure 6:
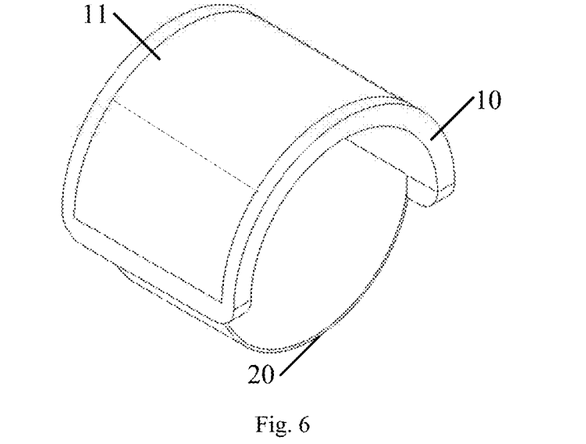
FIG. 6 illustrates a schematic view of a wristband mobile terminal in a closed state according to an embodiment of the present disclosure.

Referring to FIG. 6 which illustrates a schematic view of a wristband mobile terminal in a closed state according to an embodiment of the present disclosure, a terminal body 10 of the wristband mobile terminal is flexible and can be bent by an external force. Meanwhile, the wristband mobile terminal includes a ring band 20, and the ring band 20 can be connected to the terminal body 10. The terminal body 10 includes a first side 11 provided with the display screen which may specifically be a flexible display screen. The flexible display screen is a display screen that can be bent and folded.

Figure 7:
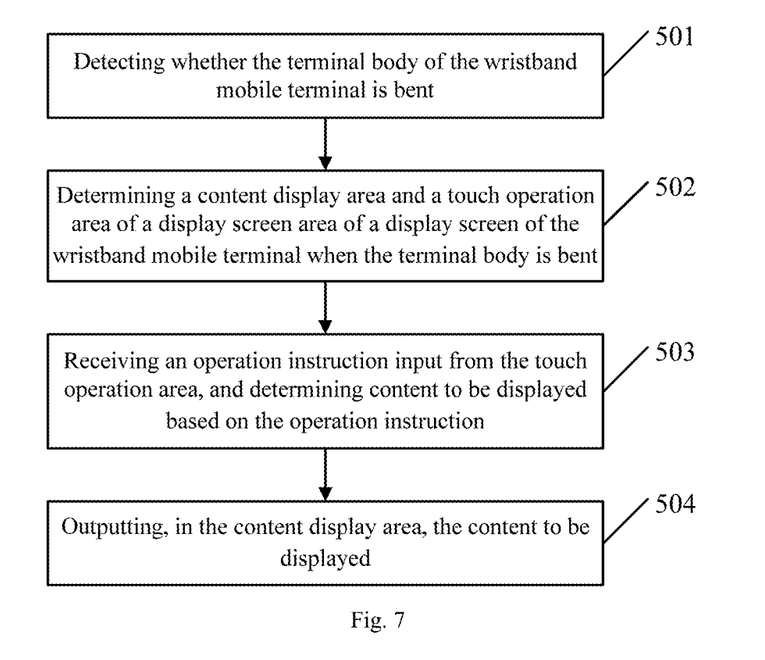
FIG. 7 illustrates a flow chart of a control method for a wristband mobile terminal according to an embodiment of the present disclosure.

Referring to FIG. 7 that illustrates a flow chart of a control method for a wristband mobile terminal according to an embodiment of the present disclosure, the method in FIG. 7 can be applied to the wristband mobile terminal illustrated in FIGS. 1-6. As illustrated in FIG. 7, the method can include the following operations at blocks illustrated in FIG. 7.

501: the wristband mobile terminal detects whether the terminal body is bent.

In the embodiment of the present disclosure, the wristband mobile terminal can detect in real time whether the terminal body 10 is bent. Specifically, a plurality of force sensors can be provided to a housing of the terminal body, and if each force sensor detects pressure having a pressure value greater than a preset threshold, it can be determined that the terminal body 10 is bent.

502: when the terminal body is bent, the wristband mobile terminal determines positions of a content display area and a touch operation area of a display screen area of the display screen.

Normally, the display screen area of the display screen can display content, and allow the user to perform touch operations on the display screen area. In the embodiment of the present disclosure, when it is detected that the terminal body 10 is bent, the wristband mobile terminal may determine the positions of the content display area (such as an area marked by dotted lines in FIG. 6) and the touch operation area.

It should be noted that the content display area is mainly used for displaying content, but the user can also perform touch operations on the content display area, and the touch operation area can mainly be used for being operated by the user. For example, when the wristband mobile terminal receives a short message, the content display area displays the content of the short message, and if the user needs to reply to the short message, the content that needs to be replied can be input through a virtual keyboard of the touch operation area.

The content display area may be any area of the display screen area, which is not limited in the embodiment of the present disclosure.

In some embodiments of the present disclosure, the content display area is an intermediate area of the display screen area of the display screen.

In some embodiments of the present disclosure, the position of the content display area can also be automatically adjusted according to the wearing position of the wristband mobile terminal by the user. For example, when the user wears the wristband mobile terminal, the wristband mobile terminal can detect a bending degree of the terminal body 10, and a portion of the display screen area of the display screen, corresponding to a relatively less bent portion, is used as the content display area.

In some embodiments of the present disclosure, the size of the content display area may be determined by the type of content to be displayed.

Specifically, when the user wears the wristband mobile terminal on the wrist, the wristband mobile terminal can determine the size of the content display area according to the type of the content to be displayed. For example, the display screen is initially in an off-screen state, and when a short message or a message from instant messaging software is received, the wristband mobile terminal can display the received short message or the message from the instant messaging software in the form of a message box, so as to remind the user, in which case only an area where the message box is located is lit and serves as the content display area. For another example, when the wristband mobile terminal enters a game or a video application, the entire screen display area of the flexible display screen can be used as the content display area.

It can be seen that determining the size of the content display area by the type of the content to be displayed can reduce power consumption of the wristband mobile terminal to a certain extent.

503: the wristband mobile terminal receives an operation instruction input from the touch operation area or the content display area, and determines the content to be displayed based on the operation instruction.

504: the wristband mobile terminal outputs the content to be displayed in the content display area.

In the embodiment of the present disclosure, the user can perform a touch operation on the wristband mobile terminal in the touch operation area, thereby converting the touch operation into a corresponding operation instruction. For example, text is input through the virtual keyboard of the touch operation area, and the screen brightness of the touch operation area is reduced or the touch operation area is even extinguished when the virtual keyboard is canceled; for another example, display interfaces are switched through the touch operation area or the content display area, which will not be limited in the embodiment of the present disclosure.

When the operation instruction is input in the touch operation area, the wristband mobile terminal can receive the operation instruction input by the user, and determine corresponding content to be displayed according to the operation instruction.

For example, when the user inputs text in the touch operation area, the wristband mobile terminal can display the input text in the content display area.

Since the wristband mobile terminal is formed into a closed ring when the user wears the wristband mobile terminal, the content displayed in the display screen area of the display screen may not be seen by the user completely at the same time. Therefore, a part of the display screen area of the display screen is used for displaying content, and the remaining part thereof is used as the touch operation area, which can improve the display effect of the wristband mobile terminal when it is worn, and thereby upgrade user experience.

It can be seen that, in the method described in FIG. 7, when the wristband mobile terminal is bent, the display screen area can determine the positions of the content display area and the touch operation area, thereby improving the display effect of the wristband mobile terminal when it is worn.

Figure 8:
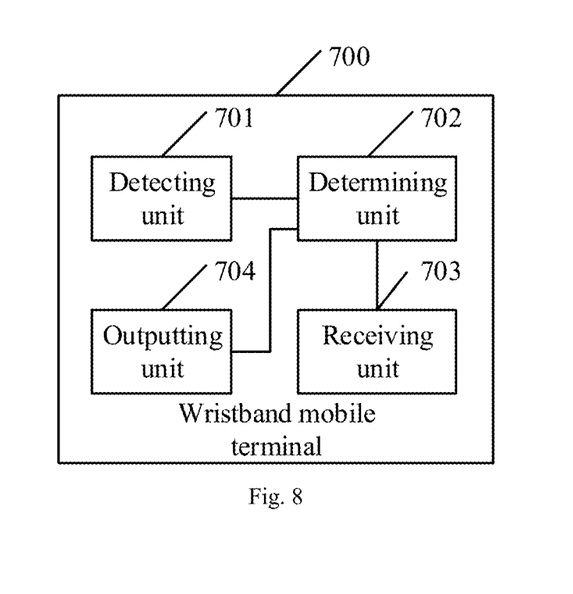
FIG. 8 illustrates a structural block diagram of a wristband mobile terminal according to an embodiment of the present disclosure.

Referring to FIG. 8 that illustrates a structural block diagram of a wristband mobile terminal according to an embodiment of the present disclosure, a wristband mobile terminal 700 in FIG. 8 can execute the control method for the wristband mobile terminal in FIG. 7. As illustrated in FIG. 8, the wristband mobile terminal 700 can include:

a detecting unit 701 configured to detect whether a terminal body is bent;

a determining unit 702 configured to determine positions of a content display area and a touch operation area of a display screen area of a display screen of the wristband mobile terminal 700 when the detecting unit 701 detects that the terminal body is bent, in which specifically, the content display area may be an intermediate area of the display screen area of the display screen, or may be any area of the display screen area, which is not limited in the embodiment of the present disclosure;

a receiving unit 703 configured to receive an operation instruction input from the touch operation area or the content display area, in which the determining unit 702 is capable of determining content to be displayed according to the operation instruction received by the receiving unit 703; and an output unit 704 configured to output, in the content display area, the content to be displayed determined by the determining unit 702.

It can be seen that, in the wristband mobile terminal described in FIG. 8, when the wristband mobile terminal is bent, the display screen area can be divided into the content display area and the touch operation area, thereby improving the display effect of the wristband mobile terminal when it is worn.

The wristband mobile terminal and the control method thereof provided by the present disclosure are described in detail. The principles and implementations of the present disclosure are described by way of specific examples. The description of the above embodiments is only for ease of interpretation of the present disclosure. At the same time, those skilled in the art may make changes in specific implementations and applications based on the concept of the present disclosure. In conclusion, the content of the specification shall not be constructed to limit the present disclosure.

What is claimed is:

1. A wristband mobile terminal, comprising:
a terminal body, the terminal body comprising a first side and a second side opposite to the first side, the second side being provided with an accommodating portion; and
a ring band, the ring band being capable of being accommodated in the accommodating portion and being capable of being detachably connected to the terminal body,
wherein when the ring band is connected to the terminal body, the wristband mobile terminal forms a closed ring;
wherein the terminal body has a first edge and a second edge disposed opposite each other and a third edge and a fourth edge disposed opposite each other, the third edge being connected with the first edge and the second edge, the fourth edge being connected with the first edge and the second edge; the accommodating portion comprises an accommodating cavity, and an opening communicated with the accommodating cavity is arranged adjacent to the third edge; the ring band has a first end and a second end, the first end is slidably provided in the accommodating cavity, the second end is capable of protruding to the outside of the accommodating cavity through the opening and being connected to the terminal body, so that the wristband mobile terminal forms the closed ring.

2. The wristband mobile terminal according to claim 1, wherein the second end is provided with a connecting element, a connecting cavity is formed in the second side and adjacent to the fourth edge, and the connecting element is snap-fitted in the connecting cavity so that the wristband mobile terminal forms the closed ring.

3. The wristband mobile terminal according to claim 2, wherein the connecting element and the ring band are formed integrally.

4. The wristband mobile terminal according to claim 2, wherein the connecting element and the ring band are formed separately, and the connecting element is connected to the second end of the ring band.

5. The wristband mobile terminal according to claim 2, wherein the connecting element comprises a first surface and a second surface perpendicular to the first surface, when the ring band is accommodated in the accommodating cavity, the second surface is parallel to an extension direction of the ring band and the first surface is perpendicular to the extension direction of the ring band.

6. The wristband mobile terminal according to claim 2, wherein a section of the connecting cavity is L-shaped.

7. The wristband mobile terminal according to claim 5, wherein sections of both of the connecting element and the connecting cavity are L-shaped, a groove is formed in the connecting cavity and the connecting element is snap-fitted in the groove.

8. The wristband mobile terminal according to claim 1, wherein the terminal body is flexible and is configured to be capable of being bent by an external force.

9. The wristband mobile terminal according to claim 1, wherein the accommodating cavity comprises a fifth edge and a sixth edge arranged opposite each other and a seventh edge and an eighth edge arranged opposite each other, the fifth edge is connected with the seventh edge and the eighth edge, and the sixth edge is connected with the seventh edge and the eighth edge; the opening is arranged adjacent to the seventh edge; a length of each of the fifth edge and the sixth is less than a length of each of the first edge and the second edge, a length of each of the seventh edge and the eighth edge is less than a length of each of the third edge and the fourth edge, and a length of the opening is less than the length of the seventh edge.

10. The wristband mobile terminal according to claim 9, wherein the ring band is provided with a stop element and the stop element has a length greater than the length of the opening and less than the length of the seventh edge.

11. The wristband mobile terminal according to claim 1, wherein the first side is provided with a display screen, the display screen has a display screen area, the display screen area is capable of being divided into a content display area and a touch operation area.

12. A wristband mobile terminal, comprising:
a terminal body comprising a first side and a second side opposite to the first side, the second side being provided with an accommodating portion;
a ring band capable of being accommodated in the accommodating portion and having a first end and a second end, the second end being capable of being drawn out of the accommodating portion and connected to the terminal body; and
a connecting member configured to connect the ring band to the terminal body;
wherein when the ring band is connected to the terminal body, the wristband mobile terminal forms a closed ring;
wherein the terminal body has a first edge and a second edge opposite to the first edge, the accommodating portion has an opening, the opening is formed adjacent to the first edge, the second end is capable of being drawn out of the accommodating portion through the opening and connected to the terminal body in a position adjacent to the second edge.

13. The wristband mobile terminal according to claim 12, wherein a connecting cavity is formed at the second side and adjacent to the second edge, and the second end is capable of being fitted into the connecting cavity.

14. The wristband mobile terminal according to claim 13, wherein the connecting member and the ring band are formed integrally.

15. The wristband mobile terminal according to claim 13, wherein the connecting member and the ring band are formed separately.

16. A control method for a wristband mobile terminal, wherein the wristband mobile terminal comprises a terminal body comprising a first side and a second side opposite to the first side, the second side being provided with an accommodating portion, and the terminal body being capable of being bent;
a ring band capable of being accommodated in the accommodating portion and having a first end and a second end, the second end being capable of being drawn out of the accommodating portion and connected to the terminal body; and
a connecting member configured to connect the ring band to the terminal body;
wherein when the ring band is connected to the terminal body, the wristband mobile terminal forms a closed ring;
wherein the terminal body has a first edge and a second edge opposite to the first edge, the accommodating portion has an opening, the opening is formed adjacent to the first edge, the second end is capable of being drawn out of the accommodating portion through the opening and connected to the terminal body in a position adjacent to the second edge;
the method comprises operations as follows:
detecting whether the terminal body is bent;
determining positions of a content display area and a touch operation area of a display screen area of a display screen of the wristband mobile terminal when the terminal body is bent;
receiving an operation instruction input from the touch operation area or the content display area and determining content to be displayed based on the operation instruction; and
outputting the content to be displayed in the content display area.

17. The control method according to claim 16, wherein the content display area is capable of being an intermediate area of the display screen area.

18. The control method according to claim 16, wherein a position of the content display area is determined according to a wearing position of the wristband mobile terminal.

* * * * *